United States Patent
Nishii et al.

(10) Patent No.: US 7,779,297 B2
(45) Date of Patent: Aug. 17, 2010

(54) FAIL-OVER METHOD, COMPUTER SYSTEM, MANAGEMENT SERVER, AND BACKUP SERVER SETTING METHOD

(75) Inventors: Yasuto Nishii, Yokohama (JP); Yoshifumi Takamoto, Kokubunji (JP); Keisuke Hatasaki, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 371 days.

(21) Appl. No.: 11/872,960

(22) Filed: Oct. 16, 2007

(65) Prior Publication Data
US 2008/0294933 A1 Nov. 27, 2008

(30) Foreign Application Priority Data
May 24, 2007 (JP) ............................. 2007-137722

(51) Int. Cl.
*G06F 11/00* (2006.01)
(52) U.S. Cl. ..................................................... 714/10
(58) Field of Classification Search ........................ None
See application file for complete search history.

(56) References Cited
U.S. PATENT DOCUMENTS
2003/0217088 A1* 11/2003 Takamoto ..................... 709/1
2006/0143498 A1* 6/2006 Hatasaki et al. ................ 714/4

FOREIGN PATENT DOCUMENTS
JP 2006-163963 6/2006
JP 2007-066216 3/2007

* cited by examiner

*Primary Examiner*—Michael C Maskulinski
(74) *Attorney, Agent, or Firm*—Mattingly & Malur, P.C.

(57) ABSTRACT

A management server obtains configuration information of an active server and creates a logical partition in a backup server so as to correspond to the active server. The backup server starts up the created logical partition. And when the created logical partition reaches a predetermined state, the backup server releases allocation of the first processor resource to the logical partition, thereby the logical partition stands by. The management server, when detecting an error occurred in the active server, stops the active server and searches the logical partition having same configuration as the active server in which error is detected, and enables allocation of the first processor resource to the searched logical partition, thereby completing the start-up of the logical partition.

17 Claims, 15 Drawing Sheets

| SERVER ID | LOGICAL PARTITION ID | SWITCHING STATE |
|---|---|---|
| S1 | L1 | False |
| S2 | L2 | True |
| S3 | L3 | False |
| S4 | L4 | False |

SERVER MANAGEMENT TABLE 502

*FIG.10*

| SERVER ID | CPU INFORMATION | | MEMORY INFORMATION | | | I/O DEVICE INFORMATION | |
|---|---|---|---|---|---|---|---|
| | CPU Q'TY | CPU ID | TOTAL CAPACITY | MEMORY ID | CAPACITY | NIC | HBA |
| S1 | 2 | CPU1 | 2GB | Mem1 | 1GB | MAC1 | WWN1 |
| | | CPU2 | | Mem2 | 1GB | MAC2 | WWN2 |
| S2 | 4 | CPU1 | 16GB | Mem1 | 4GB | MAC3 | WWN3 |
| | | CPU2 | | Mem2 | 4GB | MAC4 | WWN4 |
| | | CPU3 | | Mem3 | 4GB | MAC5 | WWN5 |
| | | CPU4 | | Mem4 | 4GB | MAC6 | WWN6 |
| S3 | 2 | CPU1 | Mem4 | Mem1 | 1GB | MAC7 | WWN7 |
| | | | | Mem2 | 1GB | | |
| | | CPU2 | | Mem3 | 1GB | MAC8 | MAC8 |
| | | | | 1GB | | | |
| S4 | 2 | CPU1 | 2GB | Mem1 | 1GB | MAC9 | WWN9 |
| | | CPU2 | | Mem2 | 1GB | MAC10 | WWN10 |

H/W CONFIGURATION INFORMATION MANAGEMENT TABLE 503

*FIG.11*

| 1201 | 1202 | 1203 | 1204 |
|---|---|---|---|
| LOGICAL PARTITION ID | VIRTUAL MEMORY ADDRESS | REAL MEMORY ADDRESS | MAPPING STATE |
| L0 | 0x0000 - 0xFFFF | 0x00000 - 0x000FF | MAPPING NOW |
| L1 | 0x0000 - 0xFFFF | 0x002FF - 0x001FF | MAPPING NOW |
| L2 | 0x0000 - 0xFFFF | 0x1FFFF - 0x10000 | ALREADY RLEASED |

MEMORY MAPPING TABLE  501

*FIG.12*

FAIL-OVER METHOD, COMPUTER SYSTEM, MANAGEMENT SERVER, AND BACKUP SERVER SETTING METHOD

CLAIM OF PRIORITY

The present application claims priority from Japanese patent application JP 2007-137722 filed on May 24, 2007, the content of which is hereby incorporated by reference into this application.

BACKGROUND OF THE INVENTION

This invention relates to a fail-over method to be employed for a computer system provided with servers to be booted up from an external disk drive, more specifically to a method for shortening the time of the fail-over execution.

In a computer system in which its servers are started up from an external disk array device, the disk array device is usually connected to a plurality of servers through a fiber channel and/or a fiber channel switch. And a boot disk used for such servers is provided in an area of the disk array device. This is why the boot disk used by a given server in the computer system can be referred to from another server in the computer system.

In such a computer system provided with a plurality of servers connected to an external disk drive through a network and booting up an operating system from the external disk drive respectively, if an error occurs in an active server that is operating an application job, the job is taken over by a backup server that is not operating the job at that time. There is a method for enabling such a taking-over processing between servers (e.g., US Patent 2006/0143498A1). According to the method, in such a taking-over time, the system detects an error occurred in an active server, then searches another server having the same configuration as the active one and not operating the subject job, then enables the searched server to access the external disk drive and to be started up from the disk drive, thereby the job is taken over to the searched server. Such a processing for enabling a backup server to take over a job from the error-occurred server is referred to as a fail-over processing.

Such a fail-over processing for starting up a backup server upon error occurrence in an active server is also referred to as cold standby.

On the other hand, there is a method for reducing the cost of introducing computer systems. According to the method, a single server is divided into a plurality of logical partitions that function as a plurality of servers respectively. For example, a set of a CPU, a memory, an I/O device, etc. are divided into a plurality of partitions and each of the partitions is allocated to a logical partition, thereby each of the logical partitions functions as a server.

And those techniques as described above can be combined to further reduce the introducing cost of a computer system enabled to execute a plurality of applications.

In the case of the above described cold standby, after an error is detected in am active server, its backup server is started up. Thus a time lag is generated unavoidably between starting-up of the backup server and restarting of the taken-over application job.

A backup server, after it is started up, requires some steps before restarting a taken-over application job. Concretely, when the server is started up, its hardware is initialized first. And in the hardware initialization, there will be executed such processes as initialization of I/O devices such as a network interface and a host bus adapter for connecting each server to external units and devices, then the memory is checked and initialized. After that, the CPU is initialized. The server then starts up its operating system. Finally, the server starts up the subject application job program to restart the job.

Particularly, the hardware initialization time increases in proportion to an increase of the number of I/O devices and the memory capacity. And in recent years, there is a trend that the number of CPUs and memory capacity are increasing. Therefore, the check and initialization times of those CPUs and memory are also increasing.

Under such circumstances, in such a fail-over processing for starting up a backup server that takes over an application job like a cold standby processing, it has been intended to solve a problem of the increasing time required from error occurrence to restarting of the taken-over job.

SUMMARY OF THE INVENTION

This invention has been made in view of this problem, and it is therefore an object of this invention to provide a fail-over method performed quickly when an error occurs in an active server.

A representative aspect of this invention is as follows. That is, there is provided a fail-over method employed for a computer system including an active server for executing an application for executing a job; a disk array apparatus having a start-up disk used for the active server; a backup server for executing the application instead of the active server when an error occurs in the active server, thereby taking over execution of the job; and a management sever for managing the active server and the backup server. The backup server has a first processor and a first memory, the first memory stores a program for dividing the first processor logically, and the logically divided first processor being allocated to create a logical partition. The fail-over method comprising: a first step for obtaining, by the management server, configuration information of the active server and creating a logical partition in the backup server so as to correspond to the active server according to the obtained configuration information; a second step for starting up, by the backup server, the created logical partition; a third step for releasing, by the backup server, allocation of the first processor to the logical partition to stop the operation of the logical partition when the created logical partition in the backup server reaches a predetermined state; a fourth step for detecting, by the management server, an error that occurs in the active server; a fifth step for stopping, by the management server, upon error detection in the active server, the active server in which error is detected; a sixth step for searching, by the management server, the logical partition having same configuration as the active server in which error is detected; and a seventh step for requesting, by the management server, allocation of the first processor to the searched logical partition to start up the logical partition.

BRIEF DESCRIPTION OF THE DRAWINGS

The present invention can be appreciated by the description which follows in conjunction with the following figures, wherein:

FIG. 10 is an explanatory diagram showing an example of the server management table in accordance with the first embodiment of this invention;

FIG. 11 is an explanatory diagram showing an example of a H/W configuration information management table 503 in accordance with the first embodiment of this invention;

FIG. 12 is an explanatory diagram showing an example of a configuration of the memory mapping table in accordance with the first embodiment of this invention;

DETAILED DESCRIPTION OF THE PREFERRED EMBODIMENTS

Hereunder, the preferred embodiments of this invention will be described in detail with reference to the accompanying drawings.

First Embodiment

Figure 1:
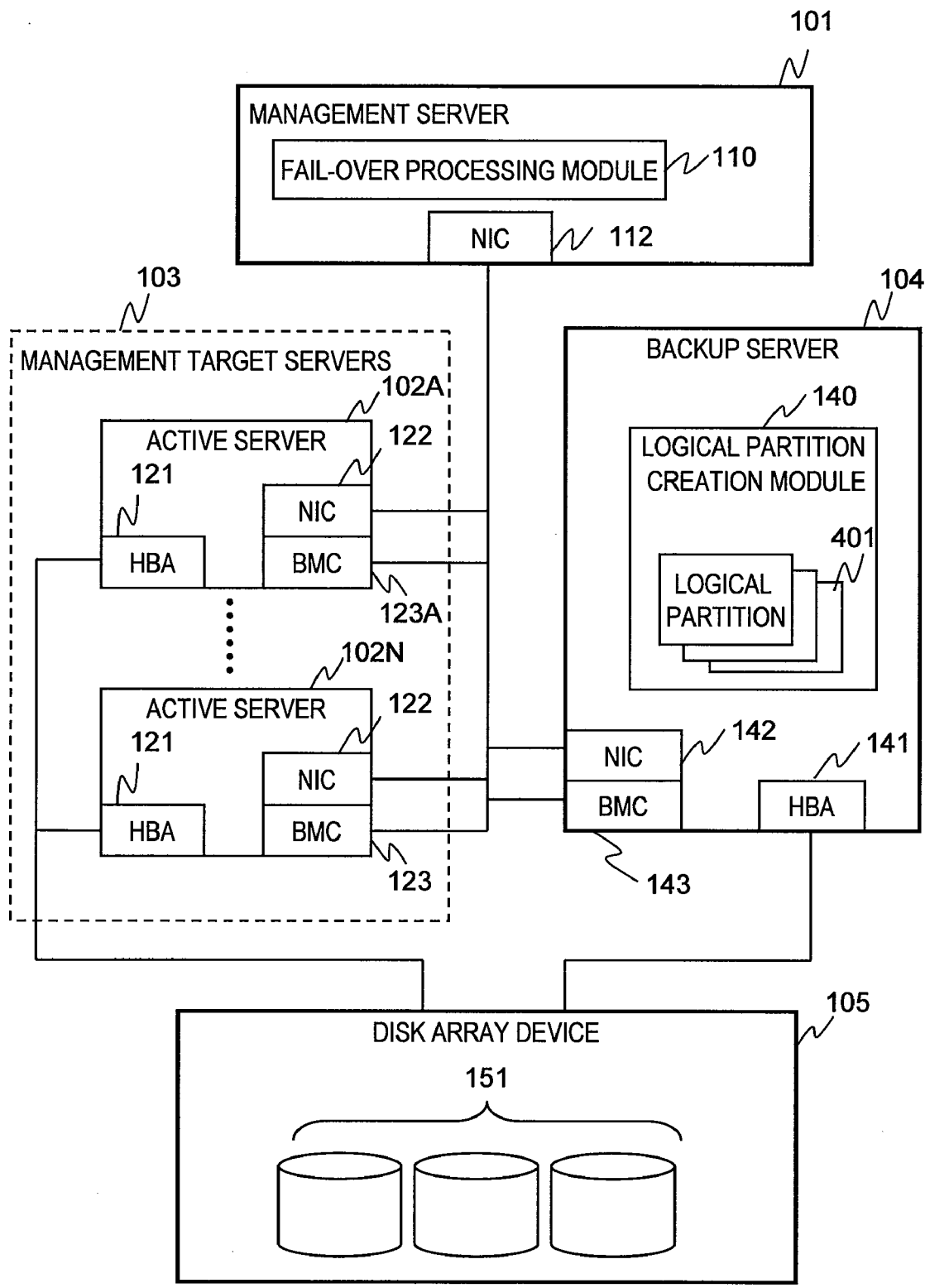
FIG. 1 is a block diagram showing a configuration of a computer system in accordance with a first embodiment of this invention.

FIG. 1 shows a computer system configuration block diagram in a first embodiment of this invention.

The computer system shown in FIG. 1 includes a management server 101, management target servers 103, a backup server 104, and a disk array device 105. The management target servers 103 are N units of active servers 102A to 102N.

Each of the active servers 102 (102A to 102N) included in the management target servers 103 is executing an application job. Hereinafter, each of those active servers 102 will be described just as an active server 102.

The management server 101 monitors the state of each active server 102 and the backup server 104 through a network. The management server 101 also issues commands for setting each active server 102 and the backup server 104.

The backup server 104 has a plurality of logical partitions 401 that function as logical servers respectively for taking over an application job from an error-occurred active server 102.

Each active server 102 includes a network interface card (NIC) that is an I/O device, a host bus adapter (HBA), and a baseboard management controller (BMC) 123.

The NIC 122 is connected to a network and enabled to communicate with the management server 101 and the backup server 104 through the network.

The HBA 121 is connected to a fiber channel and enabled to communicate with the disk array device 105 through the fiber channel.

The MBC 123 is connected to the network and enabled to communicate with the management server 101 through the network.

The management server 101 includes a fail-over processing module 110 and an NIC 112.

The fail-over processing module 110 receives error notices and controls a power supply with respect to the MBC 123 of each active server 102 and the backup server 104. The module also controls logical partitions with respect to the logical partition creation module 140. The function of the NIC 112 is the same as that of the NIC 121 of each active server 102.

The backup server 104 includes a logical partition creation module 140, an NIC 142, and a BMC 143. The functions of the HBA 141, NIC 142, and BMC 143 are the same as those of the HBA 121, NIC 122, and BMC 123 of each active server 102 respectively.

The logical partition creation module 140 includes one or more logical partitions 401. Each of those logical partitions 401 functions as one server.

The management server 101, upon error occurrence in an active server 102, switches the application job having been executed by the error-occurred active server 102 to a logical partition 401. This logical partition 401 thus takes over the application job from the error-occurred active server 102. A processing in which a job in an active server 102 is succeeded by a logical partition 401 in such a way is referred to as switching of servers.

The disk array device 105 includes two or more disk drives 151. The disk array device 105 creates one or more logical disk drives with those disk drives.

Each active server 102 has a predetermined area in a logical disk drive created in this disk array device 105. The area is used as a start-up disk. The management server 101 stores information of the start-up disk of each active server 102.

Figure 2:
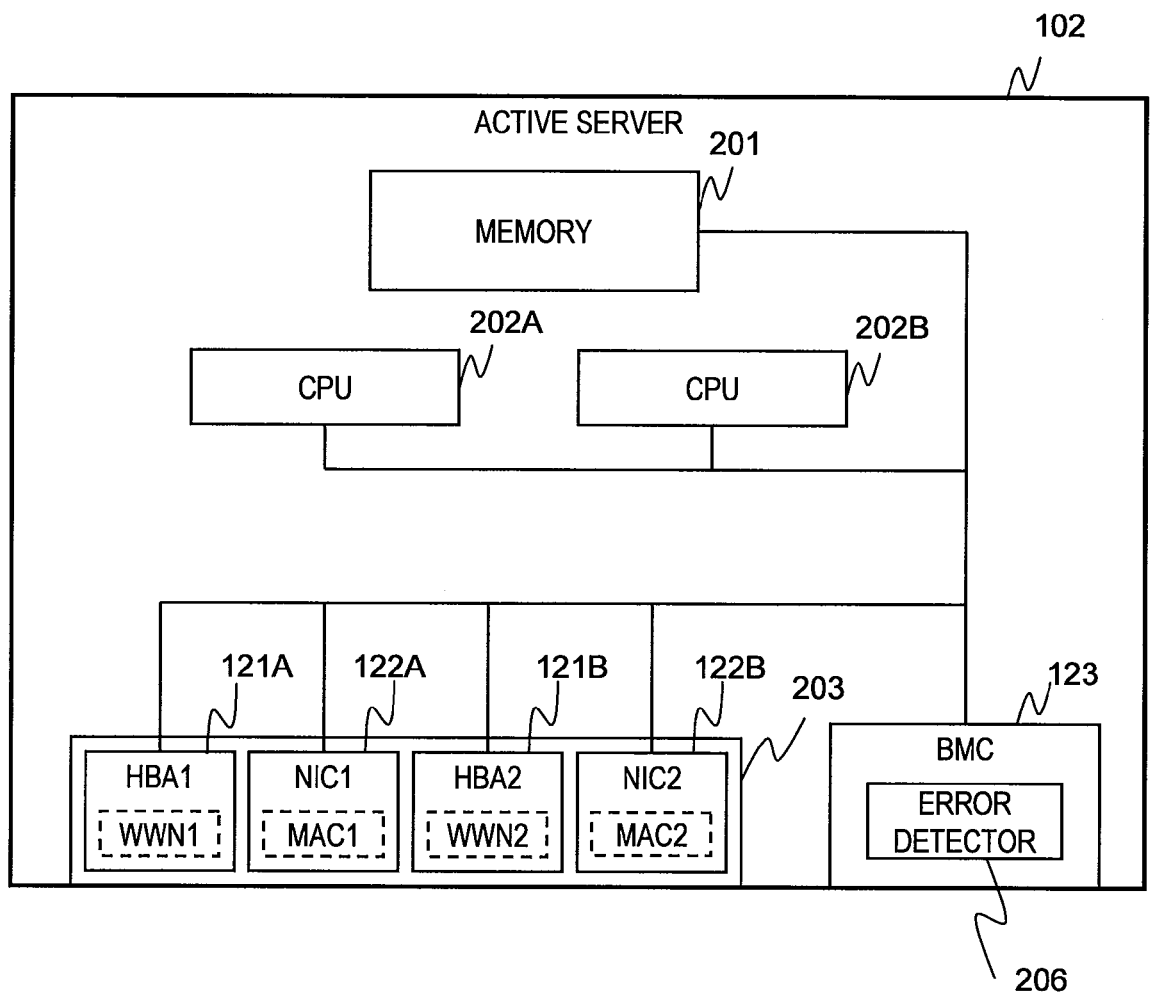
FIG. 2 is a block diagram showing a configuration of an active server in accordance with the first embodiment of this invention.

FIG. 2 shows a block diagram of a configuration of an active server 102 in the first embodiment of this invention.

Each active server 102 includes a memory 201, one or more CPUs 202 (202A and 202B), an I/O device 203, and a BMC 123.

The memory 201 stores programs and data. The CPU 202 executes programs stored in the memory 201. The I/O device 203 includes one or more interfaces (HBA 121 and NIC 122) for connecting external units and devices through a network.

The HBA 121 stores a unique identifier WWN (World Wide Name) for identifying each remote communication party in communications through a fiber channel. The NIC 122 stores a unique device identifier MAC (Media Access Control address) in the network.

In the example shown in FIG. 2, each active server 102 includes two NICs 122 and two HBAs 121. The NICs 122 have identifiers "MAC1 and "MAC2" and the HBAs 121 have identifiers "WW1" and "WWN2" set for them respectively.

The BMC 123 includes an error detector 206 and communicates with the management server 101 to monitor and control each server hardware.

The error detector 206 detects errors in the hardware of each active server 102.

The BMC 123 notifies each error detected by the error detector 206 to the management server 101 through the network. The BMC 123 enables the management server 101 to make remote controlling of ON/OFF of the power supply of each active server 102 through the network.

In FIG. 2, each active server 102 includes two CPUs, two HBAs 121, and two NICs 122. However, the number of those hardware items may be determined freely in accordance with the use and/or performance.

In FIG. 1, the management server 103 includes a plurality of active servers 102. However, it is also possible to create the target servers 103 just like that shown in FIG. 2 and set a plurality of logical partitions for the management target servers 103 so that each of those logical partitions functions as an active server 102.

Figure 3:
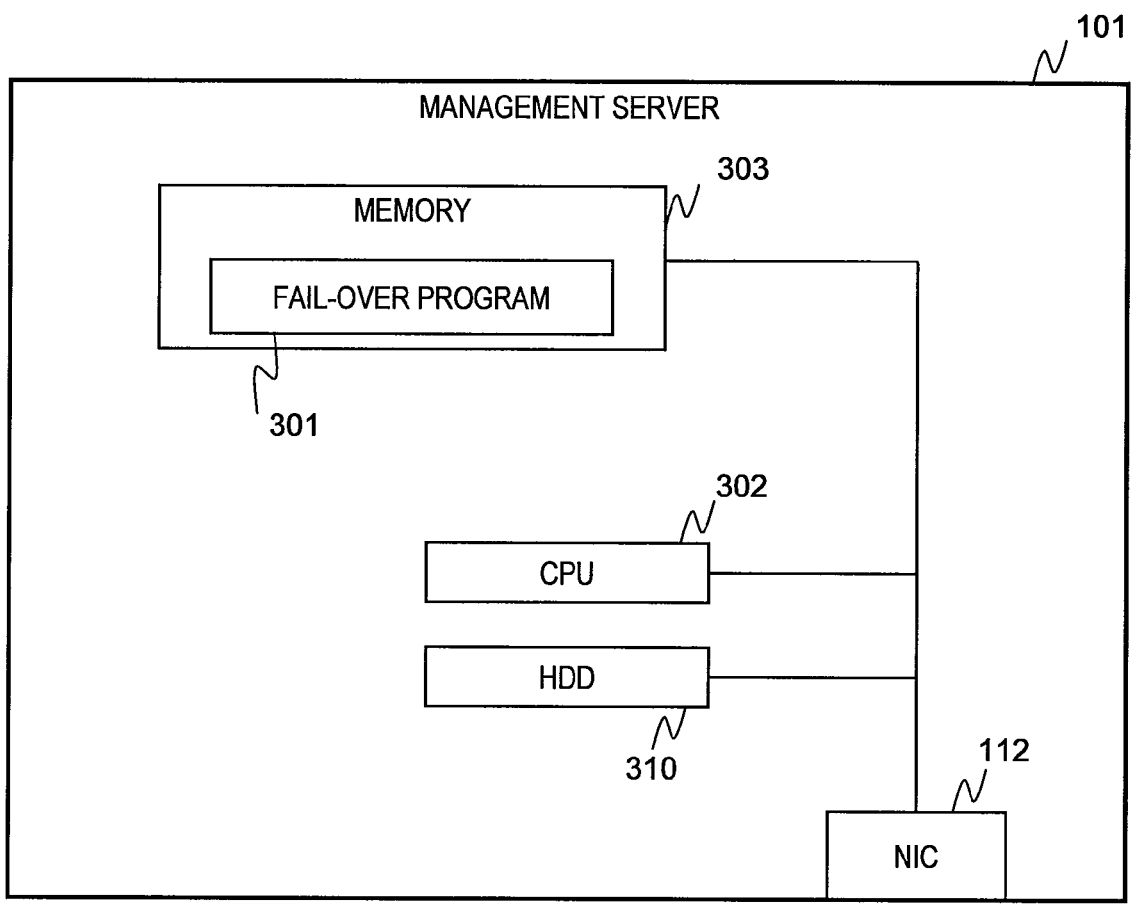
FIG. 3 is a block diagram showing a configuration of a management server in accordance with the first embodiment of this invention.

FIG. 3 shows a block diagram of a configuration of the management server 101 in the first embodiment of this invention.

The management server 101 includes a memory 303, a CPU 302, a storage unit (HDD) 310, and an NIC 112.

The memory 303 stores a fail-over program 301 executably. The CPU 302 executes this fail-over program 301, thereby a fail-over processing module 110 is configured. The fail-over processing module may not be configured with a software program like this; it may be configured with such a dedicated hardware item as a semiconductor circuit.

In FIG. 3, the management server 101 includes one CPU and one NIC 122. However, the number of those hardware items may be determined freely in accordance with the use and/or performance of the management server 101.

Figure 4:
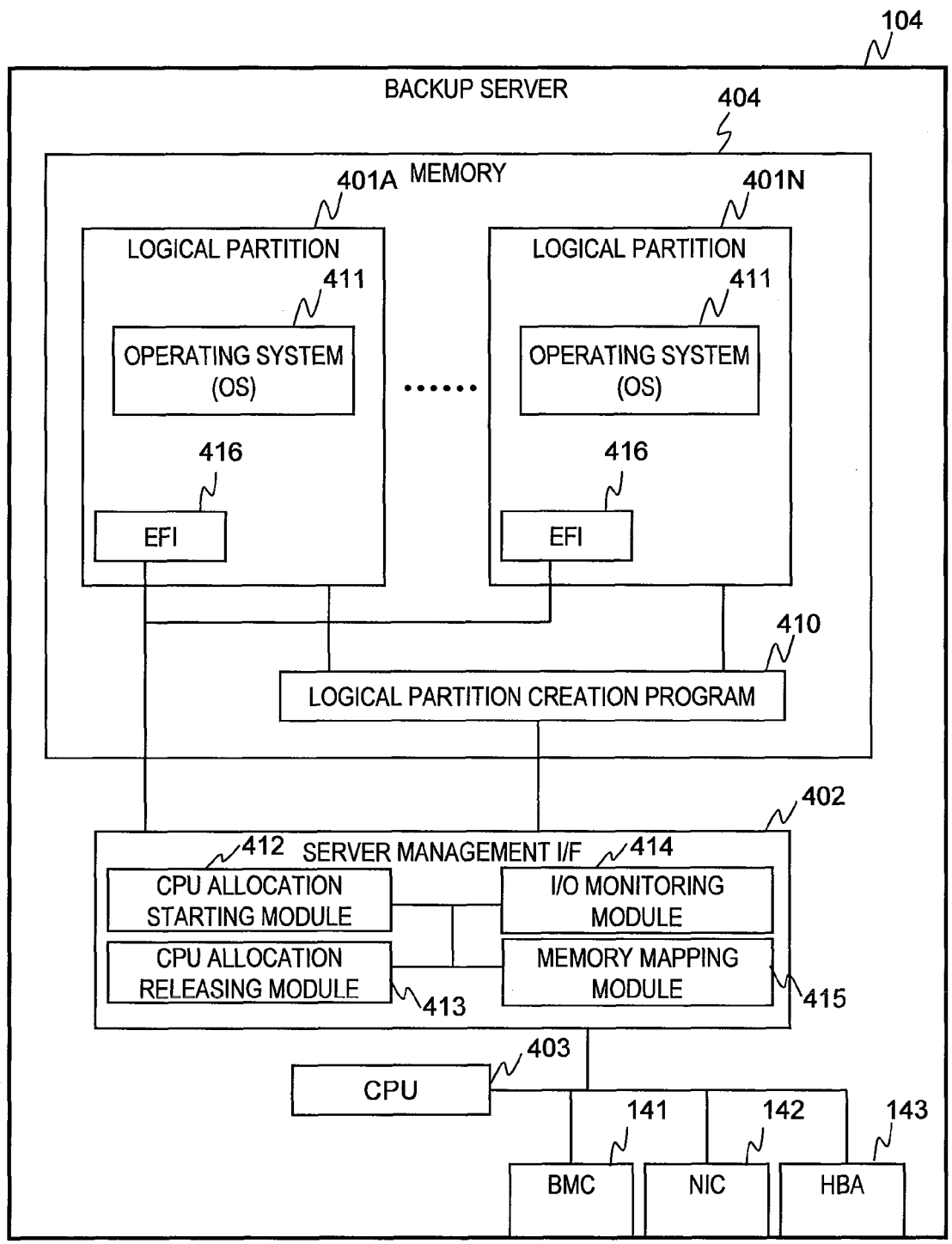
FIG. 4 is a block diagram showing a configuration of the backup server in accordance with the first embodiment of this invention.

FIG. 4 shows a block diagram of a configuration of the backup server 104 in the first embodiment of this invention.

The backup server 104 includes a memory 404, a server management interface (I/F) 402, a CPU 403, a BMC 141, an NIC 142, and an HBA 143.

The memory 404 stores a logical partition creation program 410 executably. The CPU 403 executes this program 410, thereby a logical partition creation module 140 is configured. The module 140 may not be configured with a software program like this; it may be configured with such a dedicated hardware item as a semiconductor circuit.

This logical partition creation module 140 creates one or more logical partitions 401. In the example shown in FIG. 4, N pieces of logical partitions 401A to 401N are created.

Each logical partition 401 executes an operating system (OS) 411. The logical partition 401 also includes an extensible firmware interface (EFI) 416 for controlling the start-up of the OS 411, thereby controlling the I/O processes from the OS 411 to hardware items.

The EFI 416 includes a function for specifying a place to store the OS 411, that is, a predetermined logical disk drive in the disk array device 105, a function for managing one of the plurality of OSs 411 in accordance with the priority set for the OS start-up method, and a function for stopping the start-up of an OS 411 on the way.

The server management interface (I/F) 402 controls the configuration of each of logical partitions through the logical partition creation module 140. The interface 402 also assigns I/O commands received from each logical partition 401 to real hardware items (HBA 143 and NIC 142).

The server management I/F 402 includes a CPU allocation starting module 412, a CPU allocation releasing module 413, an I/O monitoring module 414, and a memory mapping module 415.

The CPU allocation starting module 412 instructs each logical partition 401 to start CPU resource allocation. The CPU allocation releasing module 413 instructs each logical partition 401 to release the CPU resource allocation.

The I/O monitoring module 414 monitors existence of I/O events from each logical partition 401. The memory mapping module 415 manages the memory 404 of the backup server 104 and a memory (virtual memory) used actually by each logical partition 401.

In FIG. 4, the backup server 104 includes one CPU, one NIC 142, and one BMC 143. However, the number of each of those hardware items may be determined freely in accordance with the use and/or performance of the backup server 104.

The memory 404 is required to include a memory area used by the logical partitions 401 created in the backup server 104. For example, if the logical partition 401A requires a 2 GB storage area and the logical partition 401B requires a 2 GB storage area, the memory 404 is required to have at least 4 GB storage area. The memory mapping module 504 (see FIG. 5) of the fail-over processing module 110 of the management server 101 manages the memory used by those logical partitions 401.

Figure 5:
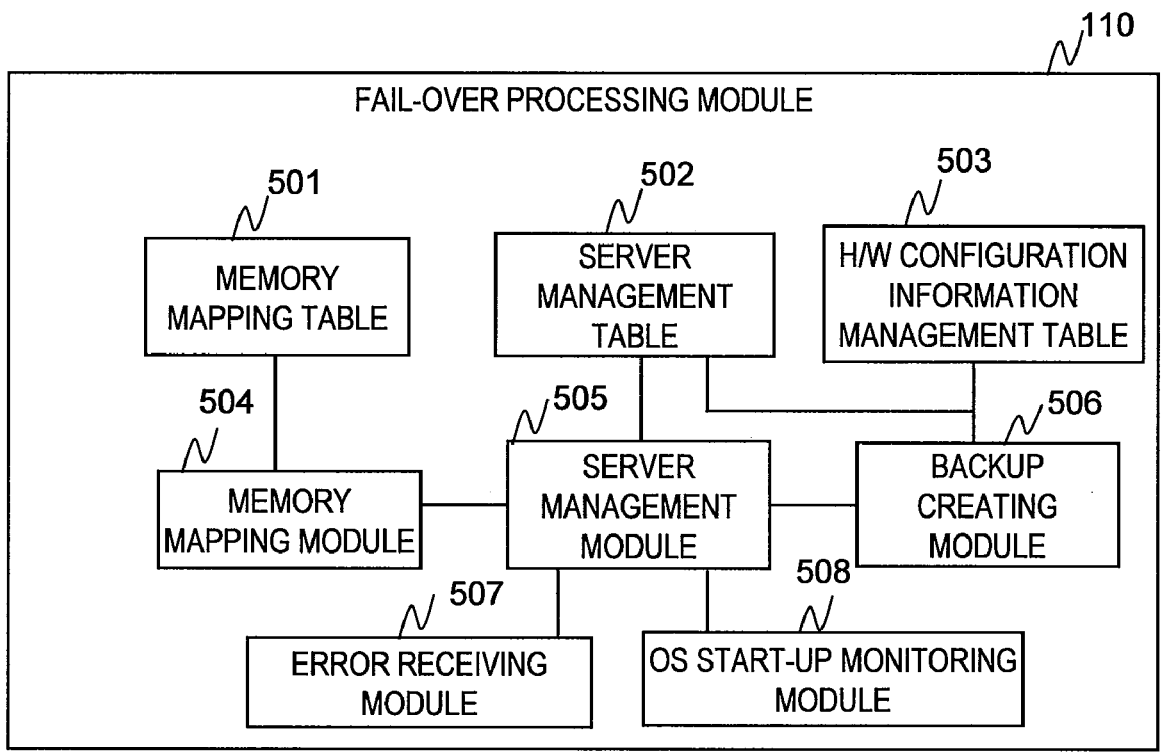
FIG. 5 is a block diagram showing a configuration of a fail-over processing module in accordance with the first embodiment of this invention.

FIG. 5 shows a block diagram of a configuration of the fail-over processing module 110 in the first embodiment of this invention.

As described above, the fail-over processing module 110 is configured when the CPU 302 executes the fail-over program 301 in the management server 101.

The fail-over processing module 110 includes a memory mapping table 501, a server management table 502, a hardware (H/W) configuration information management table 503, a memory mapping module 504, a server management module 505, a backup creating module 506, an error receiving module 507, and an OS start-up monitoring module 508.

The memory mapping table 501 stores the correspondence between memory addresses (real memory addresses) set in the backup server 104 and virtual memory addresses set in the logical partitions 401. The mapping table 501 will be described in detail later with reference to FIG. 12.

The server management table 502 stores the correspondence between active servers 102 and logical partitions 401, as well as switching occurrence states. The management table 502 will be described in detail later with reference to FIG. 10.

The H/W configuration information management table 503 stores the hardware configuration of each active server 102 and the H/W configuration information denoting the state of each active server 102, obtained by the management server 101 respectively. The management table 503 will be described in detail later with reference to FIG. 11.

The memory mapping module 504 manages the correspondence between virtual memory addresses and real memory addresses with use of the memory mapping table 501. The module 504 indicates this correspondence to the backup server 104.

The server management module 505 monitors the state of each active server 102 and controls its power supply.

The backup creating module 506 constructs logical partitions in the backup server 104. Each of those logical partition is equivalent to an active server 102.

The error receiving module 507 receives errors generated in each error-occurred active server 102.

The OS start-up monitoring module 508 monitors start-up of the OS 411 with respect to each logical partition of the backup server 104.

The fail-over processing module 110 makes switching between an active server and its backup server as to be described later with use of the tables, units, and modules described above.

Figure 6:
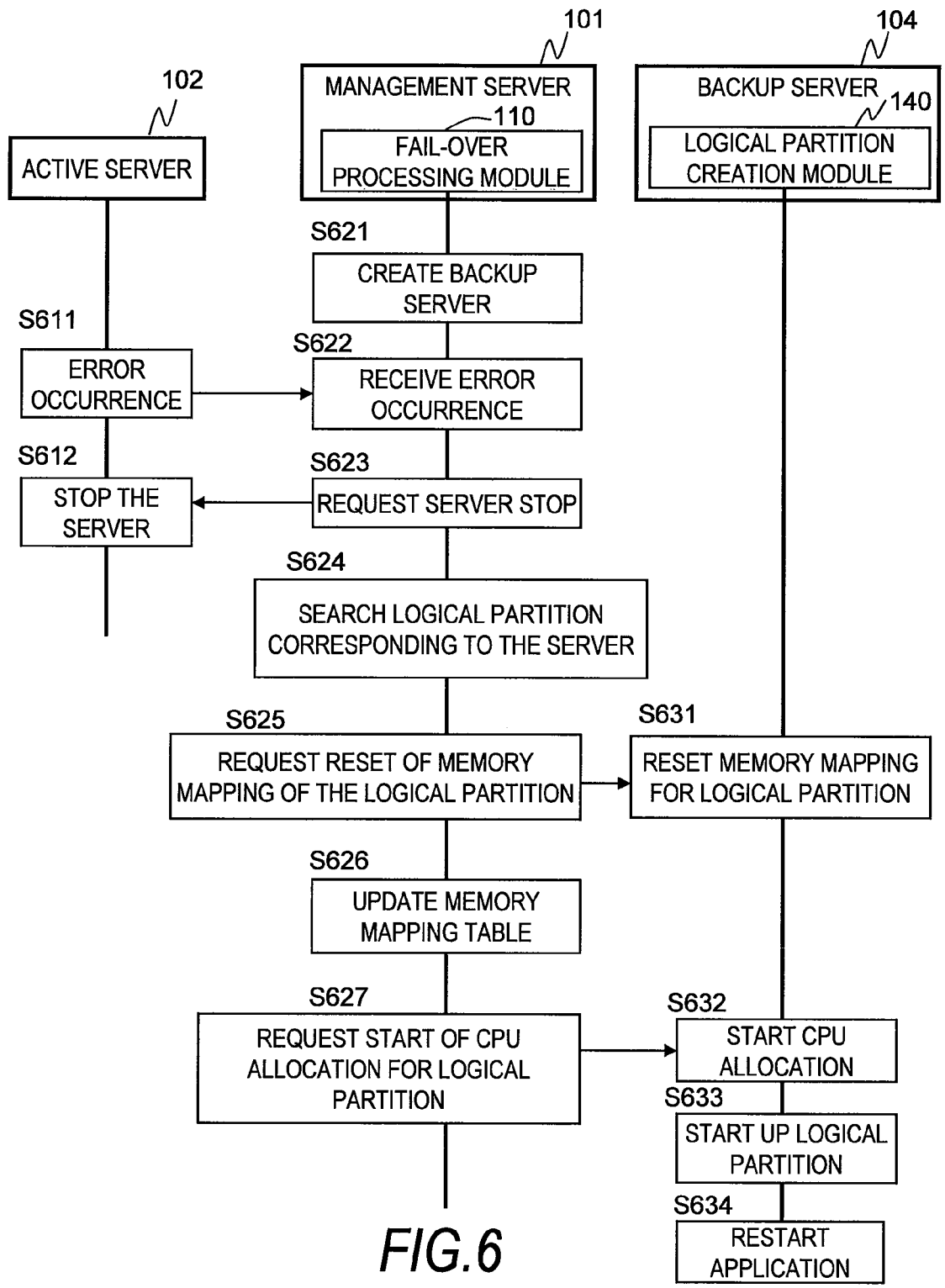
FIG. 6 is a sequence diagram showing switching between servers in accordance with the first embodiment of this invention.

FIG. 6 shows a sequence diagram for switching between servers in the first embodiment of this invention.

The processes shown in FIG. 6 are executed by each active server 102, the fail-over processing module 110 of the management server 101, and the logical partition creation module 140 of the backup server 104.

At first, in the management server 101, the backup creating module 506 of the fail-over processing module 110 executes a backup constructing processing (S621). This processing will be described later with reference to FIG. 7.

This backup constructing processing creates a logical partition 401 in the backup server 104 so as to correspond to an active server 102 included in the management target servers 103.

If an error occurs in an active server 102 after a backup constructing processing is completed, the error detector 206 provided in the BMC 123 of the active server 102 detects the error occurrence. The detected error is notified to the fail-over processing module 110 of the management server 101 through the network (S611).

In the management server 101, the error receiving module 507 of the fail-over processing module 110 receives the error occurrence notified by the error detector 206 (S622). The server management module 505 of the fail-over processing module 110 thus stops the error-occurred active server 102 (S623). Concretely, the server management module 505 sends an active server shut-down request to the BMC 123 of the error-occurred active server 102 through the network.

Receiving the request from the fail-over processing module 110 of the management server 101, the active server 102 turns off the power of the active server 102 to stop the active server 102 (S612).

After that, in the management server 101, the server management module 505 of the fail-over processing module 110 searches a logical partition 401 corresponding to the stopped active server 102 in the server management table 502 (S624).

After that, the server management module 505 requests the memory mapping module 504 to reset the memory mapping of the logical partition corresponding to the stopped active server 102 (S625).

When the memory mapping is reset in such a way, the memory mapping of the logical partitions 401 in the backup server 104 is reset, thereby the logical partitions 401 are set so as to be started up respectively (S631).

The processes in steps S625 and S631 will be described later with reference to FIG. 9.

Then, the memory mapping module 504 registers the result of memory mapping reset by the processing in step S625 in the memory mapping table 501 to update the contents therein (S626).

When the memory mapping is reset in such a way, the server management module 505 requests the backup server 104 to start CPU resource allocation to the logical partition 401 corresponding to the stopped active server 102 (S627).

Then, in the server management I/F 402 of the backup server 104, the CPU allocation starting module 412 starts CPU resource allocation to the logical partition 401 requested from the server management module 505 (S632). Consequently, the logical partition 401 is started up (S633). As a result, the started-up logical partition 401 takes over the application job from the stopped active server 102, thereby the application job is restarted (S634).

As described above, upon error occurrence in an active server 102 of the management target servers 103, a logical partition 401 constructed in the backup server 104 takes over and restarts the application job being processed by the active server 102.

Figure 7:
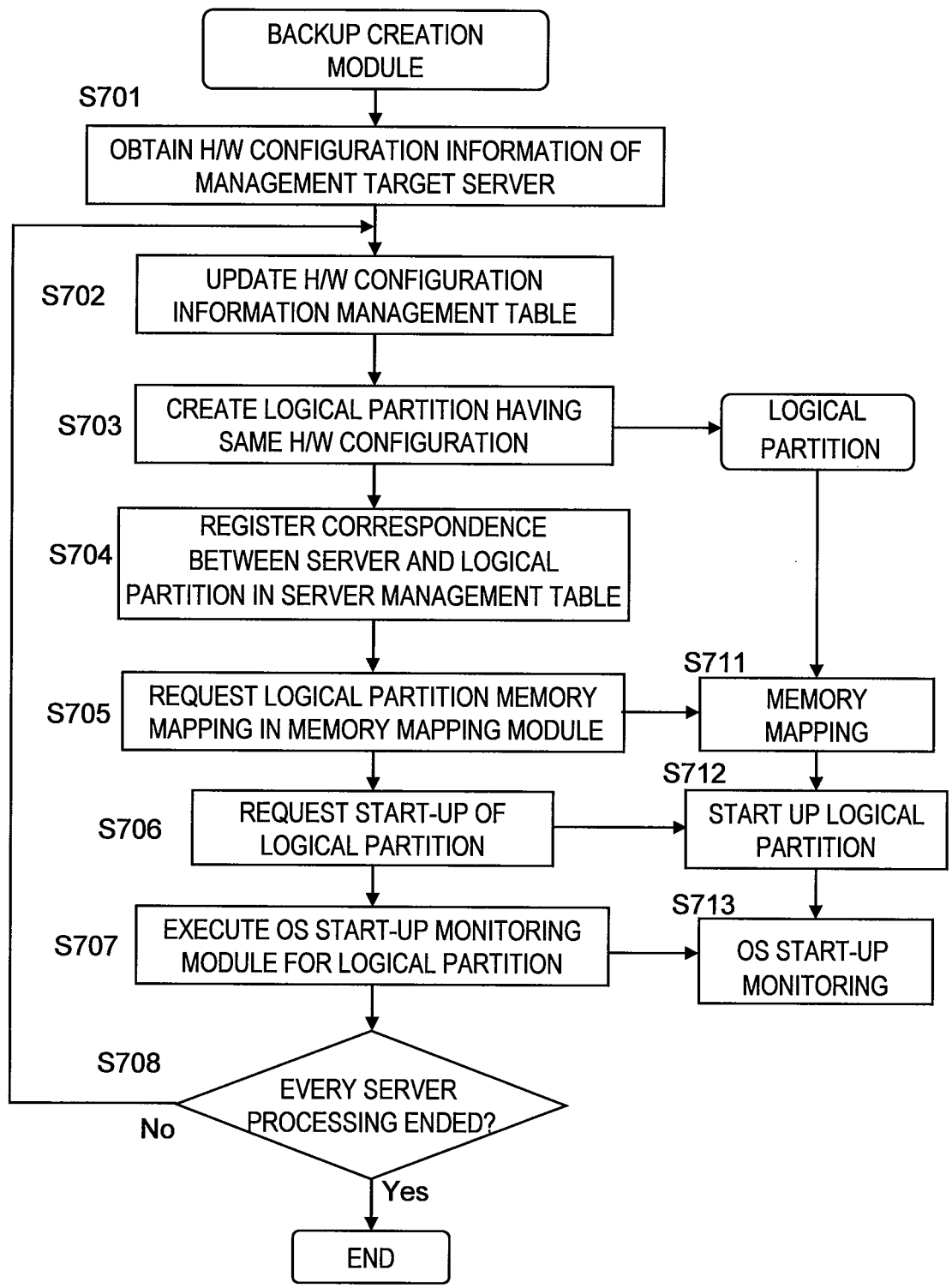
FIG. 7 is a flowchart showing a backup processing in accordance with the first embodiment of this invention.

FIG. 7 shows a flowchart of the backup processing in step S621 shown in FIG. 6 in the first embodiment of this invention.

The processes shown in FIG. 7 are executed by the backup creating module 506 of the fail-over processing module 110 in the management server 101. This processing is executed, for example, when the computer system shown in FIG. 1 is reconfigured or when the computer system configuration is modified as follows.

At first, the backup creating module 506 obtains the hardware configuration information (H/W configuration information) of all the active servers 102 included in the management target servers 103 (S701).

The H/W configuration information includes the identifier of every active server 102, the number of CPUs provided for each active server 102, the identifier of each CPU, the capacity of each memory, NIC's MAC address, HBA's WWN, etc.

In the processing in this step S701, the backup creating module 506 requests the BMC 123 to obtain the H/W configuration information of every active server 102 included in the management target servers 103. In response to the request, the BMC 123 of every active server 102 sends its own H/W configuration information to the request source management server 101.

The management server 101 already stores the information of each of the servers (management target servers 103, each active server 102, the backup server 104, and the disk array device 105, etc.) included in the computer system in the memory 303. The backup creating module 506 obtains the H/W configuration information from every active server 102 included in the management target servers 103 from the stored information.

After that, the backup creating module 506 selects one of the active servers from the management target servers 103 and registers the H/W configuration information obtained from the selected active server 102, the server ID of the selected active server 102 in the H/W configuration information management table 503 (see FIG. 11) as new entries to update the contents of the table 503 (S702).

Then, the backup creating module 506 requests the backup server 104 to create a logical partition 401 corresponding to an entry newly registered in the H/W configuration information management table 503 (S703).

Receiving this request from the backup creating module 506, the logical partition creation module 140 of the backup server 104 creates a logical partition 401 corresponding to the each H/W configuration information. At this time, the logical partition creation module 140 sets a unique logical partition ID for each logical partition 401.

After that, the backup creating module 506 registers the correspondence between logical partition identifiers set by the logical partition creation module 140 and server identifiers in the server management table 502 (S704). The server management module 505 can obtain the correspondence between active servers 102 and logical partitions 401 according to the information registered in this server management table 502.

Then, the backup creating module 506 requests memory mapping to the memory mapping module 504 (S705). Memory mapping means replacing a memory space used by a logical partition 401 created in the backup server 104 by another memory space temporarily while the logical partition 401 stands by.

In response to a memory mapping request from the backup creating module 506, the memory mapping module 504 refers to the memory mapping table 501 and replaces the memory space (a real memory address) set for the logical partition 401 by another memory space (a virtual memory address) temporarily. Thus the real memory address of the logical partition in the backup server 104 is changed to a virtual memory address (S711).

The processes in these steps S705 and 711 will be described later with reference to FIG. 9.

Upon completion of the memory mapping by the memory mapping module 504, the backup creating module 506 requests start-up of the logical partition 401 in the backup server 104 (S706). In response to this request, the logical partition creation module 140 of the backup server 104 instructs the logical partition 401 to be started up (S712) as follows.

At first, the logical partition creation module 140 of the backup server 104 initializes the hardware used by the logical partition 401. Concretely, the logical partition creation module 140 executes processes for assigning a processing to the CPU 403, allocating an area of the memory 404 to the CPU 403, assigning a MAC address to the NIC 142, and assigning WWN to the HBA 141.

Upon completion of this hardware initialization, an EFI 416 is configured in the logical partition 401. This EFI 416 thus begins reading the OS from a predetermined area in the disk array device 105.

Before reading the OS, the backup creating module 506 requests the OS start-up monitoring module 508 to monitor the OS starting-up (S707). The OS start-up monitoring module 508 thus monitors the state of the logical partition 401 and stops the operation of the logical partition if the logical partition 401 makes an I/O processing to a predetermined area in the OS stored disk array device 105. Then, in accordance with the processing, the logical partition creation module 140 of the backup server 104 stops the allocation of the CPU resource to the logical partition 401 just before the logical partition 401 reads the OS and sets the logical partition 401 in the standby state (S713).

Upon execution of an application job by an active server 102, the OS contents keeps changing in accordance with version-ups, patch adaptations, etc. Consequently, if the OS is read each time a processing is switched from an active server 102 to a logical partition 401, the application job can always be taken over in the latest state.

The processes in these steps S707 and S713 will be described later with reference to FIG. 8.

The processes in the steps S702 to S707 create a logical partition 401 in the backup server 104 so as to correspond to an active server 102. The created logical partition 401 stops and stands by in a state just before reading its OS.

In this first embodiment, one backup server 104 configures the same number of logical partitions 401 as the number of active servers 102. However, it is also possible to configure a plurality of backup servers 104 and distribute a logical partition 401 corresponding to each of the active servers 102 in each of those plurality of backup servers 104.

Then, the backup creating module 506 decides whether or not the processes in the steps S702 to S707 are completed for every active server 102 included in the management target servers 103 (S708).

If there is any active server 102 in which those processes are not completed yet, the backup creating module 506 executes the processes in the steps S702 to 707 for the active server 102. If the processes are completed for every active server 102 in the object management target servers 103, the system exits the processes in this flowchart.

In such a way, the processing shown in FIG. 7 creates a logical partition 401 created similarly to an active server 102 included in the management target servers 103. Upon error occurrence in any one of the active servers 102 in the management target servers 103, the created logical partition 401 is used to take over the application job from the active server 102.

Particularly, until the OS of the logical partition 401 is started up after an error occurs in an active server 102 due to a memory mapping processing in step S711, a virtual address is allocated to each logical partition 401. Thus the memory capacity to be secured by the logical partitions 401 is reduced.

This is why the fail-over processing is executed quickly if an error occurs in an active server 102 and a logical partition 401 corresponding to the active server 102 is started up (fail-over) in this embodiment. Because, the start-up of the logical partition 401, for example, the hardware initialization is already completed at that time.

Figure 8:
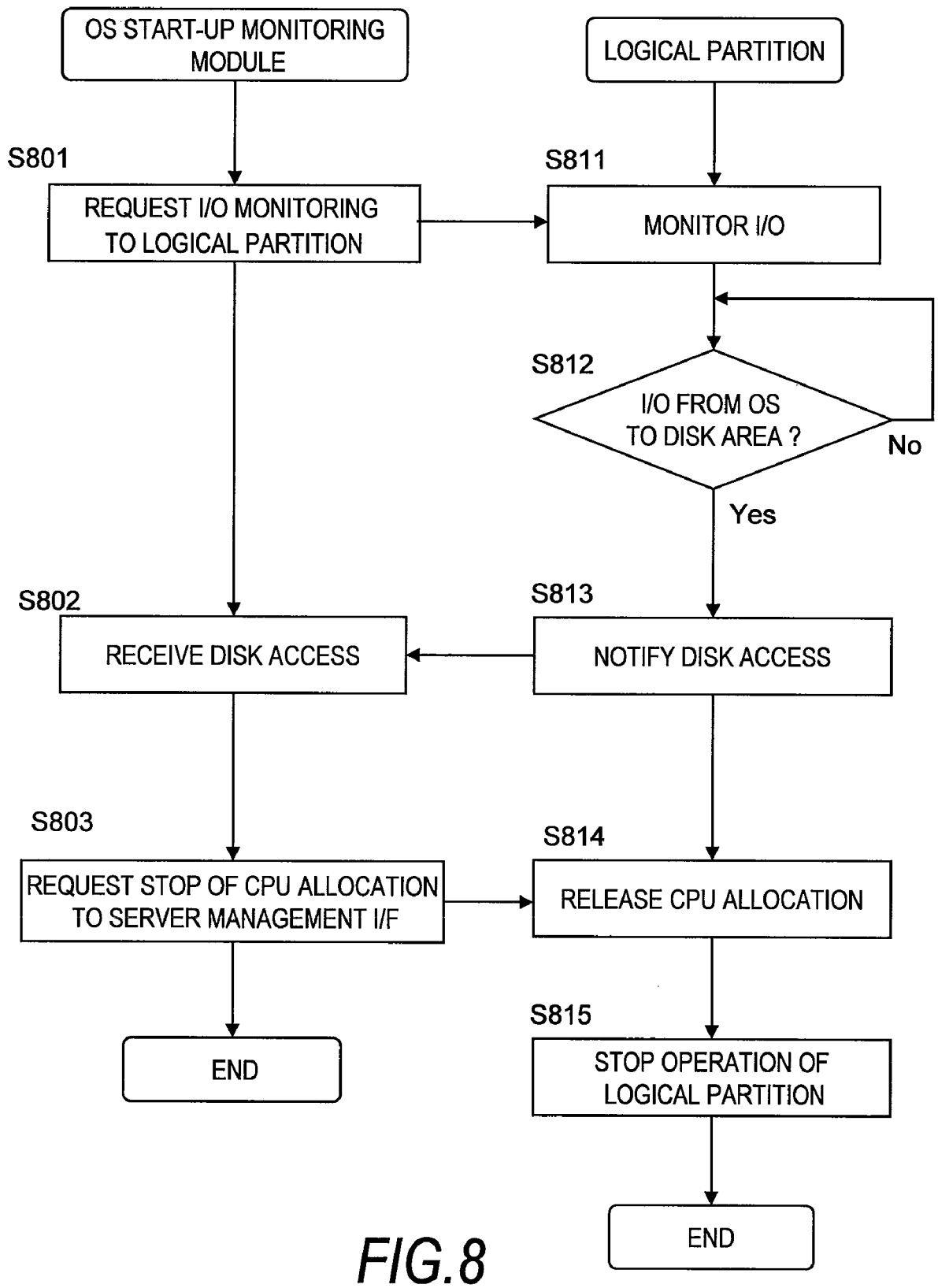
FIG. 8 is a flowchart showing processes for monitoring the OS start-up in accordance with the first embodiment of this invention.

FIG. 8 shows a flowchart of processes for monitoring the OS start-up executed by the OS start-up monitoring module 508 of the fail-over processing module 110 provided in the management server 101 in the first embodiment of this invention.

In step S713 shown in FIG. 7, the server management module 505 of the fail-over processing module 110 requests execution of OS monitoring, then the OS start-up monitoring module 508 executes the processes in this flowchart as follows.

At first, the OS start-up monitoring module 508 requests I/O monitoring of the logical partitions 401 in the backup server 104 (S801).

Concretely, the OS start-up monitoring module 508 specifies the identifier of the object logical partition 401 to the server management I/F 402 of the backup server 104 and requests the server management I/F 402 to monitor the I/O processes of the specified logical partition 401.

The server management I/F 402 receives the I/O monitoring request through the BMC 143.

In response to the request, the I/O monitoring module 414 of the server management I/F 402 begins monitoring the I/O processes of the specified logical partition (S811). Then, the I/O monitoring module 414 checks if any I/O processing request is issued from the logical partition 401. If there is an I/O processing request, the I/O monitoring module 414 obtains the contents requested by the I/O processing and executes the processing in step S812.

The I/O monitoring module 414 decides whether or not the I/O processing issued by the specified logical partition 401 is a read request to a disk area that stores the OS to be started up by the logical partition 401 (S812).

In step S812, if it is decided that there is no I/O processing with respect to the disk area that stores the OS to be started up by the logical partition 401, the I/O monitoring module 414 executes the processing in step S812 again. If it is decided in step S812 that there is an I/O processing to the above OS-stored disk area, the I/O monitoring module 414 executes the processing in step S813.

In step S813, the I/O monitoring module 414 sends a notice to the management server 101 through the BMC 143. The notice denotes that there is an I/O processing with respect to the above OS-stored disk area.

Upon receiving the notice (S802), the OS start-up monitoring module 508 in the management server 101 goes to step S803.

In step S803, the OS start-up monitoring module 508 sends a request to the server management If/F 402 of the backup server 104 (S803). The request is for releasing the CPU resource allocation to the logical partition 401.

In the backup server 104, upon receiving the releasing request, the CPU allocation releasing module 413 of the server management I/F 402 releases the CPU resource allocation to the specified logical partition 401 (S814).

In such a way, the CPU allocation releasing module 413 zero-clears the CPU time-division resource allocation to the specified logical partition 401, thereby the operation of the logical partition 401 stops (S815).

In such a way, the processes in the flowchart shown in FIG. 8 stop the operation of the specified logical partition 401 after the hardware initialization is completed and just before the OS is started up.

Consequently, upon a fail-over processing, there is no need to initialize the hardware of the logical partition 401. Thus switching between servers is quickened more than the so-called cold starting.

Particularly, if a backup server is cold-started up while the subject active server 102 requires a large memory capacity, the memory initialization time becomes longer. In such a case, some more time is also required to initialize such interfaces as the NIC 142, HBA 141, etc. In the first embodiment of this invention, the subject logical partition 401 of the backup server 104 stops after its hardware initialization is completed. Thus the server hardware initialization time is reduced.

In the processes shown in the flowchart in FIG. 8, reading from the OS-stored disk drive is detected by an I/O processing requested from the specified logical partition 401. However, the EFI 416 provided for the logical partition 401 may read such OS reading. Concretely, when starting up the logical partition 401 is requested and the hardware of the logical partition 401 is completed, the EFI 416 begins reading from the OS-stored disk drive. The server management I/F 402 may report this reading to the management server 101.

The EFI 416 may also be set beforehand so that the EFI 416 reports to the server management I/F 402 that it is ready to start OS reading and actually begins the OS reading only when receiving the response from the server management I/F 402.

Also in this first embodiment, the specified logical partition 401 stops just before OS starting-up. However, the stop timing of the logical partition 401 is not limited only to the OS start-up timing. For example, the logical partition 401 may stop after the OS is started up and just before the subject application job is started up.

Figure 9:
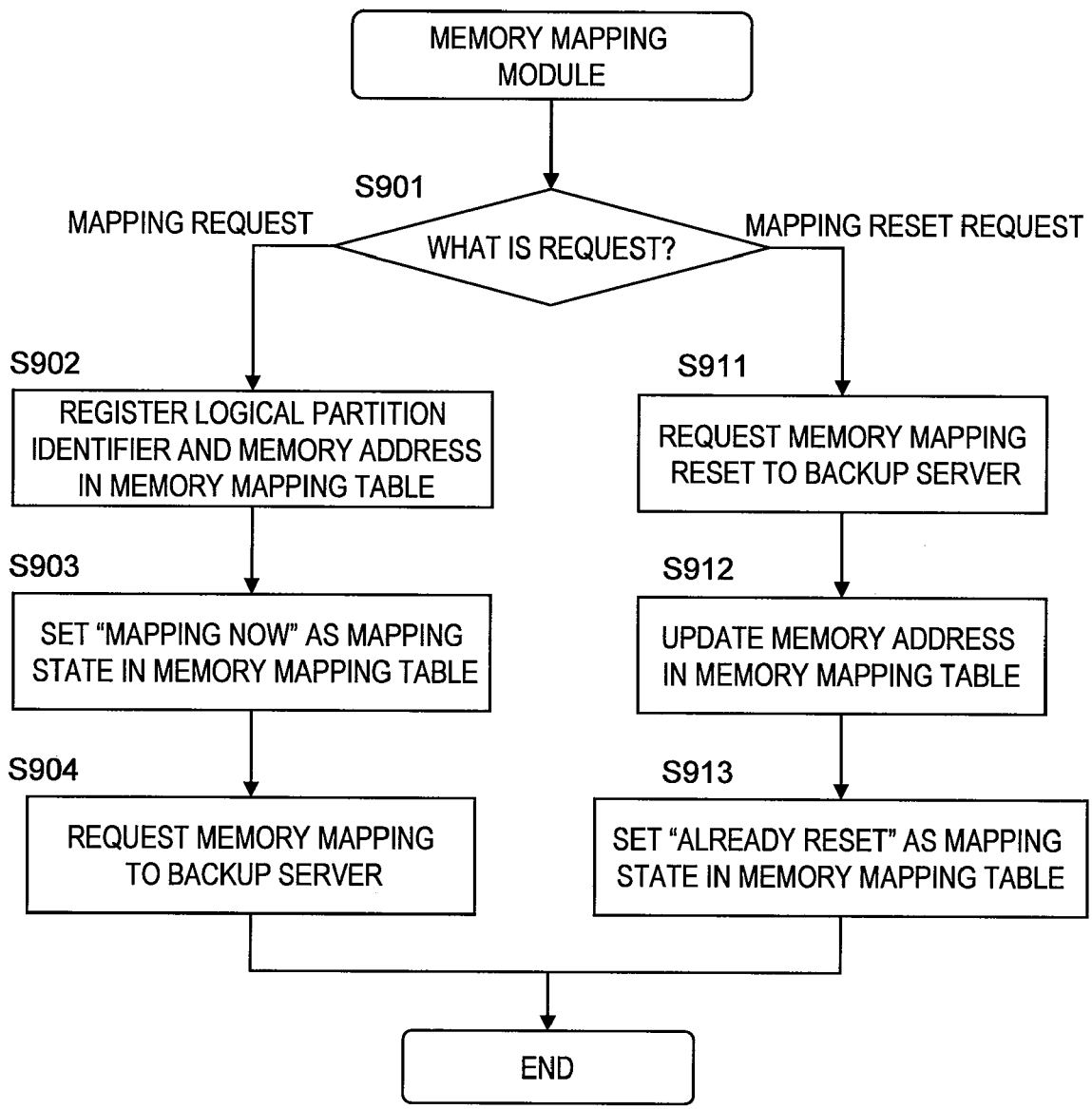
FIG. 9 is a flowchart showing a memory mapping processes in accordance with the first embodiment of this invention.

FIG. 9 shows a flowchart of the memory mapping processes executed by the memory mapping module 504 in step S625 shown in FIG. 6 and in step S705 shown in FIG. 7 in the first embodiment of this invention.

At first, the memory mapping module 504 decides what is the request issued from the server management module 505 or backup creating module 506 (S901).

If the request is a memory mapping request, the memory mapping module goes to step S902. If the request is a memory mapping resetting request, the memory mapping module 504 goes to step S911.

In step S902, the memory mapping module 504 registers the identifier of the logical partition specified by the request, as well as virtual and real memory addresses in the memory mapping table 501.

After that, the memory mapping module 504 sets "mapping now" as the state of an entry in the memory mapping table 501 registered in step S902 (S903).

After that, the memory mapping module 504 requests the backup server 104 to make memory mapping of the specified logical partition 401 (S904).

Concretely, the memory mapping module 504 specifies the identifier of the specified logical partition 401 and virtual and real memory addresses thereof, then requests the backup server 104 to make the memory mapping. In the backup server 104, the memory mapping module 415 of the server management I/F 402 assigns a virtual memory address to the requested logical partition 401.

A memory space of the requested logical partition 401 is thus set as a virtual memory address in accordance with the processes in steps S902 to S904.

On the other hand, in step S911, the memory mapping module 504 requests the backup server 104 to reset the memory mapping of the requested logical partition 401.

Concretely, the memory mapping module 504 specifies the identifier of the requested logical partition 401 and requests the backup server 104 to reset the memory mapping. In the backup server 104, the memory mapping module 415 of the server management I/F 402 makes memory mapping from the virtual memory address allocated to the requested logical partition 401 to a real memory address.

After that, the memory mapping module 504 makes memory mapping from the real memory address of an entry of the specified logical partition 401 to a real memory address to be used actually by the logical partition 401 in the backup server 104 (S912).

Then, the memory mapping module 504 changes its mapping state to "reset" in the memory mapping table 501 (S913).

The processes in steps S911 to S913 are executed to set a memory space of the requested logical partition 401 as a real memory address.

FIG. 10 shows an explanatory diagram of an example of the server management table 502 in the first embodiment of this invention.

The fail-over processing module 110 manages the server management table 502. The table 502 stores the correspondence between each active server 102 included in the management target servers 103 and its corresponding logical partition 401 switched over by a fail-over processing. The table 502 also stores data denoting whether or not there has been switching between servers.

The server management table 502 includes three columns.

The column 1001 stores identifiers of active servers 102. A server identifier is information that can identify an active server 102 uniquely in a computer system. The server identifier may be, for example, the serial number of each active server.

The column 1002 stores identifiers of logical partitions 401. A logical partition identifier is information that can identify a logical partition 401 uniquely in the backup server 104. For example, this identifier may be given uniquely by the logical partition creation module 140 when the logical partition 401 is created.

The column 1003 stores states, each denoting whether or not an active server 102 has been switched to a backup one by a fail-over processing. If an error occurs in an active server 102 registered in the column 1001 and a fail-over processing is executed to switch the application job from the active server 102 to a logical partition 401, "True" is set as the switching state in this column 1003. On the other hand, if no fail-over processing has been executed yet even after an error occurs in an active server 102 registered in the column 1001, "False" is set as the switching state in this column 1003.

In the example shown in FIG. 10, the active server 102 denoted by the server identifier S1 corresponds to the logical partition 401 denoted by the logical partition identifier L1 and the switching state "False" denotes that no switching has been made yet.

The active server 102 denoted by the server identifier S2 corresponds to the logical partition 401 denoted by the logical partition identifier L2 and the switching state "True" denotes that switching has already been made.

FIG. 11 shows an explanatory diagram of an example of the H/W configuration information management table 503 in the first embodiment of this invention.

The H/W configuration information management table 503 stores the H/W configuration information of each active server 102 managed by the fail-over processing module 110.

As described above, the backup creating module 506 obtains the H/W configuration information of each active server 102 included in the management target servers 103 and registers the obtained H/W configuration information for the identifier of each active server 102 in the H/W configuration information management table 503.

The H/W configuration information management table 503 includes four columns 1101 to 1104.

The column 1101 stores server identifiers. The server identifiers in this column 1101 are the same as those shown in FIG. 10.

The column 1102 stores CPU information of each active server 102. The CPU information includes the number of CPUs and identifiers of those CPUs.

The column 1121 in the column 1102 stores the number of CPUs in each active server 102.

The column 1122 in the column 1102 stores CPU identifiers. Each CPU identifier is information for identifying a CPU uniquely in a subject active server 102. The CPU identifier may be, for example, a CPU slot number.

Each physically divided CPU has a unique CPU slot number, that is, a unique CPU identifier in the above example. This does not means, however, that this management is not always be made in units of a single CPU. The unit of management may be changed as needed by taking consideration to the error detection accuracy, unit of allocation to logical partitions, etc. For example, the management may be made in units of a CPU core included in the CPU.

The column 1103 stores memory information. The memory information includes a total memory capacity, memory identifiers, and the capacity of each memory identifier.

The column 1131 in the column 1103 stores a total capacity of the storage area of each memory in each active server.

The column 1132 in the column 1103 stores memory identifiers. A memory identifier is information for identifying each divided memory uniquely in each active server 102. A memory identifier may be, for example, a memory slot number.

The column 1133 in the column 1103 stores the capacity of each storage area of each memory identifier.

Memory information is decided in units of a memory slot, that is, a memory identifier of each of physically divided memories. However, this does not mean that the unit of management is based only on a single memory. The unit of management may be varied as needed by taking consideration to the error detectable granularity, unit of allocation to logical partitions, etc. For example, the management may be made in units of a memory bank.

The column 1104 stores information of I/O devices (NIC, HBA) provided for each active server 102.

The column 1141 in the column 1104 stores the MAC address of each NIC.

The column 1142 in the column 1104 stores the WWN of each HBA.

The column 1104 may store information of other I/O devices when each active server 102 includes I/O devices other than NICs and HBAs.

In the example shown in FIG. 11, the active server denoted with a server identifier S1 includes two CPUs (CPU1 and CPU2). The total memory capacity of this active server 102 is 2 GB and 1 GB is allocated to the memory identifier "Mem1" and 1 GB is allocated to the memory identifier "Mem2". This active server 102 also includes an NIC 122 having an identifier "MAC1" and an HBA 121 having an identifier "WWN1".

FIG. 12 shows an explanatory diagram for an example of a configuration of the memory mapping table 501 in the first embodiment of this invention.

The memory mapping table 501 stores the state of the virtual memory address of each logical partition 401 managed by the fail-over processing module 110.

The memory mapping table 501 includes four columns 1201 to 1204.

The column 1201 stores identifiers of the logical partitions 401. Each of the logical partition identifiers is the same as that shown in FIG. 10.

The column 1202 stores the virtual memory address set for each logical partition 401.

The column 1203 stores the real memory address set for each logical partition 401.

The column 1204 stores information (mapping state) denoting whether or not the memory address of each logical partition 401 is mapped to a virtual memory address.

For example, the logical partition having an identifier L0 has a memory address "0x0000-0xFFFF" allocated as a virtual memory address and "0x00000-0x000FF" allocated as a real memory address respectively. The mapping state of this logical partition 401 is "mapping now". This means that a virtual memory address is assigned to this logical partition 401.

FIG. 13 shows an explanatory diagram for memory mapping through a memory mapping processing in the first embodiment of this invention.

In this first embodiment, a backup server 104 includes a plurality of logical partitions 401. Consequently, if a required memory is allocated to a logical partition corresponding to an active server 102 included in the management target servers 103, the amount of the memory required for the backup server 104 increases. As a result, the memory of the backup server 104 comes to be in short of capacity.

In this first embodiment, therefore, a virtual memory address is assigned to a real memory address required for each logical partition 401 and when the logical partition 401 stands by, the amount of the memory used by the backup server 104 is suppressed.

Figure 13A:
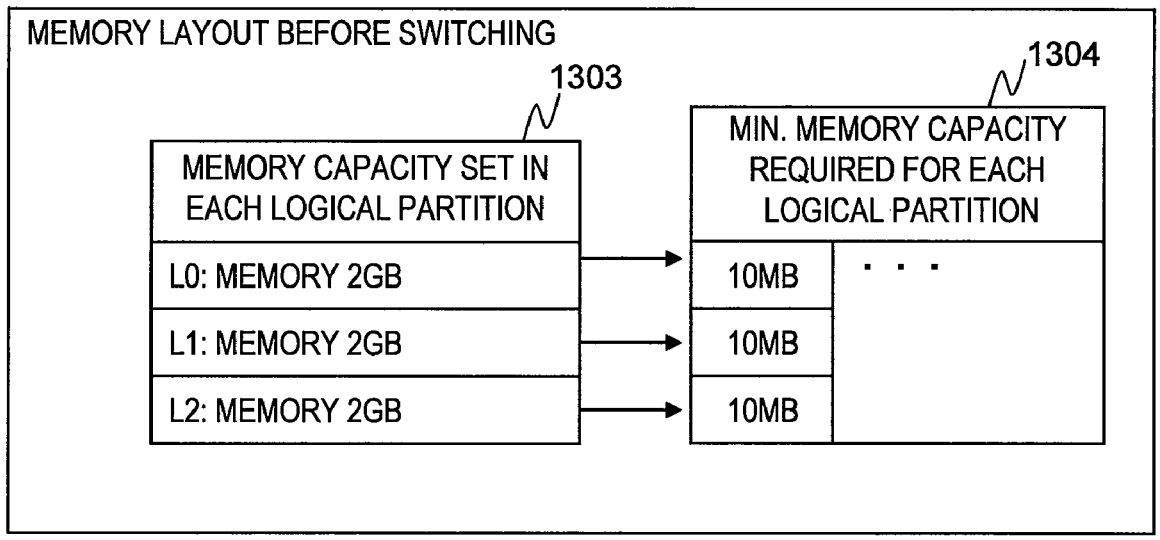
FIG. 13A is an explanatory diagram showing memory mapping before switching in accordance with the first embodiment of this invention.

FIG. 13A shows a configuration of a memory of each logical partition 401 of the backup server 104.

Logical partitions 104 are created in the backup server 104 in step S611 (backup construction) shown in FIG. 6. A 2 GB real memory address is set for each of those logical created partitions 401.

At this time, none of the IS, application program, etc. is running in any of the logical partitions 401, so that every set memory address capacity is not required. Thus the minimum necessary memory capacity (10 MB here) required when those logical partitions 401 stand by is set as virtual memory addresses.

In the example shown in FIG. 13A (memory layout), three logical partitions (L0, L1, and L2) are set and a 10 MB virtual memory address is set for each of those logical partitions 401. Consequently, the total memory capacity used by those three logical partitions is only 30 MG.

Figure 13B:
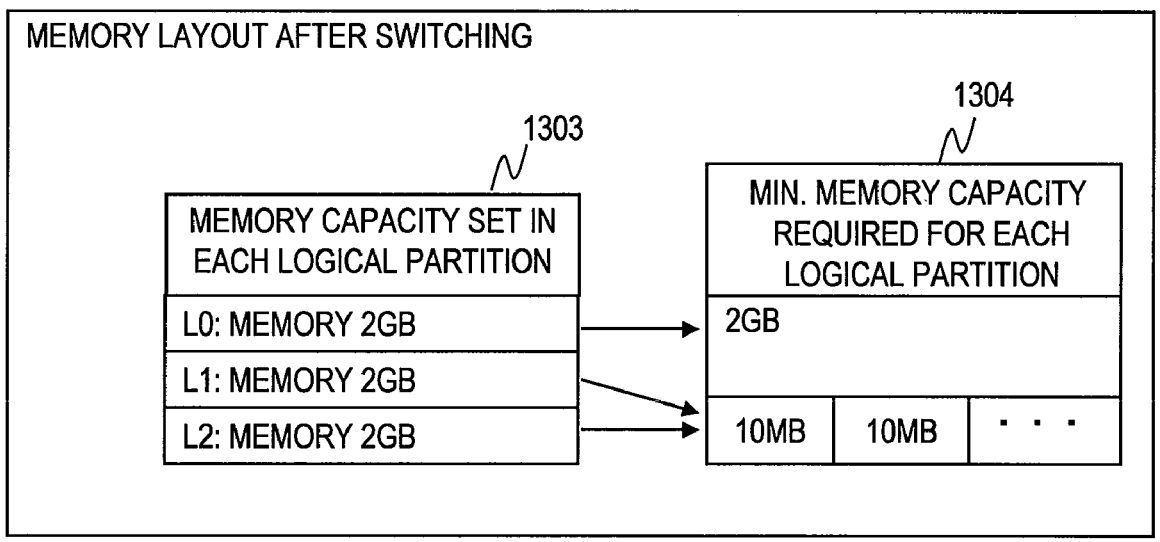
FIG. 13B is an explanatory diagram showing memory mapping after switching in accordance with the first embodiment of this invention.

FIG. 13B shows a memory layout assumed when an error occurs in an active server 102 and the server 102 is switched to a logical partition L0 through a fail-over processing.

The logical partition L0, which is subjected to memory mapping while it is in the standby state, is set to a virtual memory address. The memory mapping is reset at the time of switching-over of servers and a required total memory address of 2 GB is set for the logical partition 401. Also in this case, a virtual memory address is set for each of other logical partitions 401 that stand by.

In such a way, this embodiment can suppress the memory capacity of the backup server 104 provided with logical partitions 401 to be switched over from active servers 102.

Figure 14:
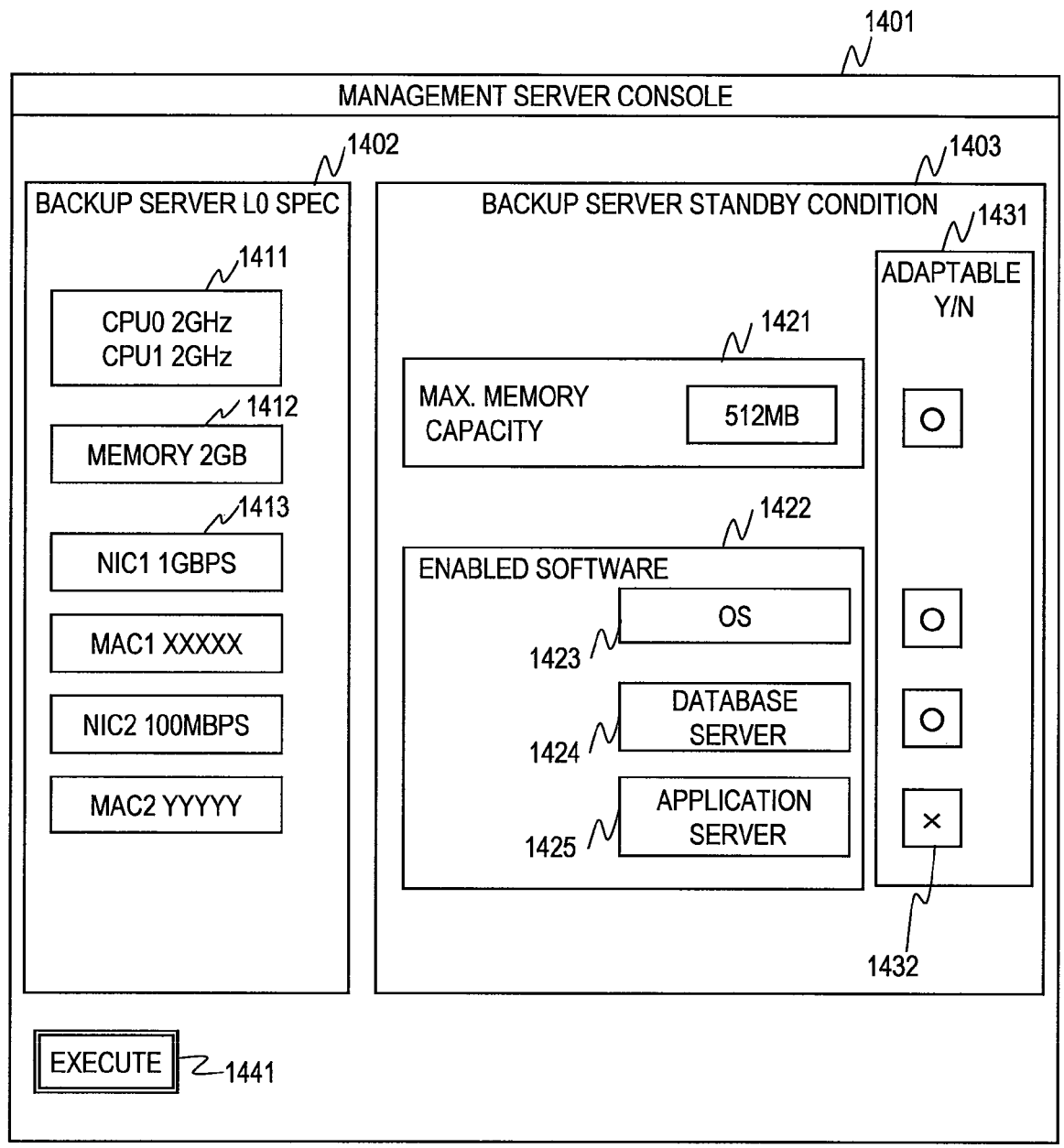
FIG. 14 is an explanatory diagram showing an example of a user interface of the management server in accordance with the first embodiment of this invention.

FIG. 14 shows an explanatory diagram for an example of a user interface of the management server 101 in the first embodiment of this invention.

This user interface (I/F) 1401 is displayed on a display screen of the management server 101 or on a screen of a terminal that can execute items set in the management server 101 through a network. The manager checks the settings of each logical partition 401 of the backup server 104 with use of this user I/F and changes the settings as needed.

The manager can also use a screen 1402 to check the settings (specifications) of each set logical partition 401.

The screen 1402 consists of a screen 1411 for confirming the number of CPUs and each CPU clock, a screen 1412 for confirming the capacity of each memory, and a screen 1413 for confirming the number of I/O devices and their setting items. The displayed setting items of the I/O devices are, for example, a communication speed and a MAC address of the NIC 122.

The screen 1403 is used to set a state in which each subject logical partition 401 is to be stopped.

As described above, the fail-over processing module 110 stops the logical partition 401 just before the partition 401 reads the OS. It is also possible for the manager to set items so as to keep the OS not to be started up in another state.

The screen 1421 is used to set a maximum memory capacity at which each subject logical partition 401 is kept not to be started up.

In step S707 (OS start-up monitoring) shown in FIG. 7, a subject logical partition 401 is stopped just before the partition 401 is started up to read the OS. In this case, it is also possible to set items so as to stop a subject logical partition when a subject logical partition 401 is started up and its memory capacity in use exceeds a value set on the screen 1421.

The screen 1422 is used to set a software program to be started up in a logical partition 401.

In step S707 (OS start-up monitoring) shown in FIG. 7, a subject logical partition 401 is stopped just before the partition 401 is started up to read the OS. In this case, however, it is possible to set items so as to stop a subject logical partition 401 after the OS and other software programs are read and the logical partition 401 is started up. In an example shown in FIG. 14, it is possible to set whether to enable the OS, database server, and application server to be started up respectively.

The screen 1431 is used to decide whether to apply items set on the screens 1421 and 1422 to a subject logical partition 401.

A small circle "o" is set in the setting box 1432 to use the item corresponding to the setting box 1432. A small cross "x" is set in the setting box 1432 not to use the item corresponding to the setting box 1432.

When all items are set, an execution button 1441 is clicked to validate the set items in the subject logical partition 401.

In the example shown in FIG. 14, it is denoted that the maximum memory capacity is set at 512 MB and starting-up of the OS and database server are enabled.

According to the above settings, in the backup construction processing shown in FIG. 6, the subject logical partition 401 is stopped when all the conditions are satisfied, that is, when the memory capacity used by the logical partition 401 reaches 512 MB, the OS is started up, and the database server is started up. In this case, when an error occurs in an active server 102 and the server 102 is switched to a logical partition 401 set as shown in FIG. 14, the set OS and database server are already started up. Consequently, the restarting time of the taken-over job is reduced.

In this first embodiment, because the computer system is configured as described above, each logical partition 401 in the backup server 104 is set so as to be switched from an error-occurred active server 102. And the subject logical partition 401 is stopped when the hardware of this logical partition 401 is initialized or set by the management server 101 and just before the partition 401 reads the OS from the disk array device 105. Consequently, the start-up of the logical partition 401 is quickened and the fail-over processing time is reduced more than that of the cold-start in which a switched server is started up from the initial state.

And because a plurality of logical partitions 401 are formed for a plurality of active servers 102 in the backup server 104, the number of backup servers is suppressed (e.g., only one backup server), the introduction and operation costs of the subject computer system can be reduced.

Second Embodiment

Next, a second embodiment of this invention will be described.

In the first embodiment described above, the subject logical partition 401 is stopped just before the partition 401 reads the OS. In this second embodiment, however, the logical partition 401 is stopped when its memory capacity in use exceeds a predetermined value.

Figure 15:
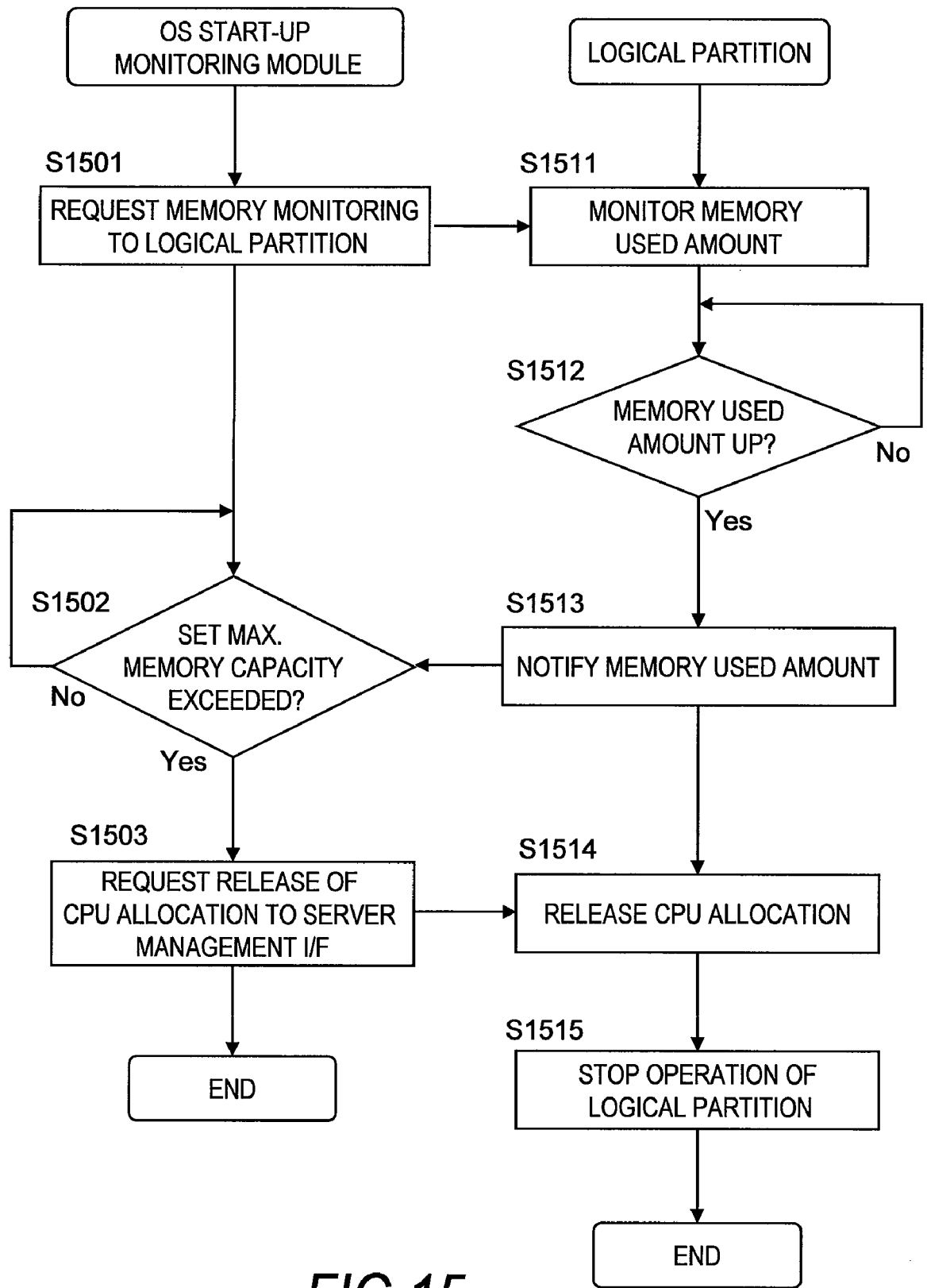
FIG. 15 is a flowchart showing the OS start-up monitoring processing in accordance with a second embodiment of this invention.

FIG. 15 shows a flowchart of the OS start-up monitoring processing in this second embodiment of this invention.

In step S713 shown in FIG. 7 in the first embodiment, when the server management module 505 of the fail-over processing module 110 requests execution of OS monitoring, the OS start-up monitoring module 508 executes the processes of this flowchart as follows.

At first, the OS start-up monitoring module 508 requests the backup server 104 to monitor the memory of the subject logical partition 401 (S1501).

Concretely, the OS start-up monitoring module 508 specifies the identifier of the subject logical partition 401 and requests the server management I/F 402 of the backup server 104 to monitor the memory capacity used by the specified logical partition 401.

The server management I/F 402 of the backup server 104 receives the memory monitoring request through the BMC 143.

Then, the I/O monitoring module 414 of the server management I/F 402 begins monitoring the memory capacity used by the specified logical partition 401 (S1511).

After that, the I/O monitoring module 414 decides whether or not the memory capacity used by the specified logical partition 401 has increased (S1512).

If the memory capacity increases, the module 414 goes to step S1513 and sends the memory capacity used by the logical partition 401 to the management server 101 through the BMC 143. If not, the module 414 executes the processing in step S1512 again.

In the management server 101, the OS start-up monitoring module 508 receives the memory capacity used by the logical partition 401 from the backup server 104. Then, the OS start-up monitoring module 508 decides whether or not the received memory capacity exceeds a preset memory capacity (S1502). If the memory capacity exceeds the preset value, the OS start-up monitoring module 508 goes to step S1503. If not, the OS start-up monitoring module 508 executes the processing in step S1502 again.

In step S1503, the OS start-up monitoring module 508 sends a request to the server management I/F 402 of the backup server 104. The request is for stopping the CPU resource allocation to the logical partition 401.

In the backup server 104, the CPU allocation releasing module 413 of the server management I/F 402, upon receiving the request, releases the CPU resource allocation to the specified logical partition 401 (S1514).

When the CPU time-division allocation to the logical partition 401 is cleared to 0 by the CPU allocation releasing module 413, the logical partition 401 stops its operation (S1515).

In the second embodiment of this invention, the subject logical partition 401 stops when its memory capacity in use exceeds a predetermined value in such a way, not just before the OS is started up. Consequently, the hardware initialization time can be reduced similarly to the first embodiment. In addition, because a maximum memory capacity can be set for each logical partition 401 in the backup server 104, the logical partitions 401 in the backup server 104 can be managed efficiently.

Third Embodiment

Next, a third embodiment of this invention will be described.

In the first embodiment described above, each logical partition 401 has an EFI 416. In this third embodiment, however, each logical partition 401 has a legacy BIOS.

Figure 16:
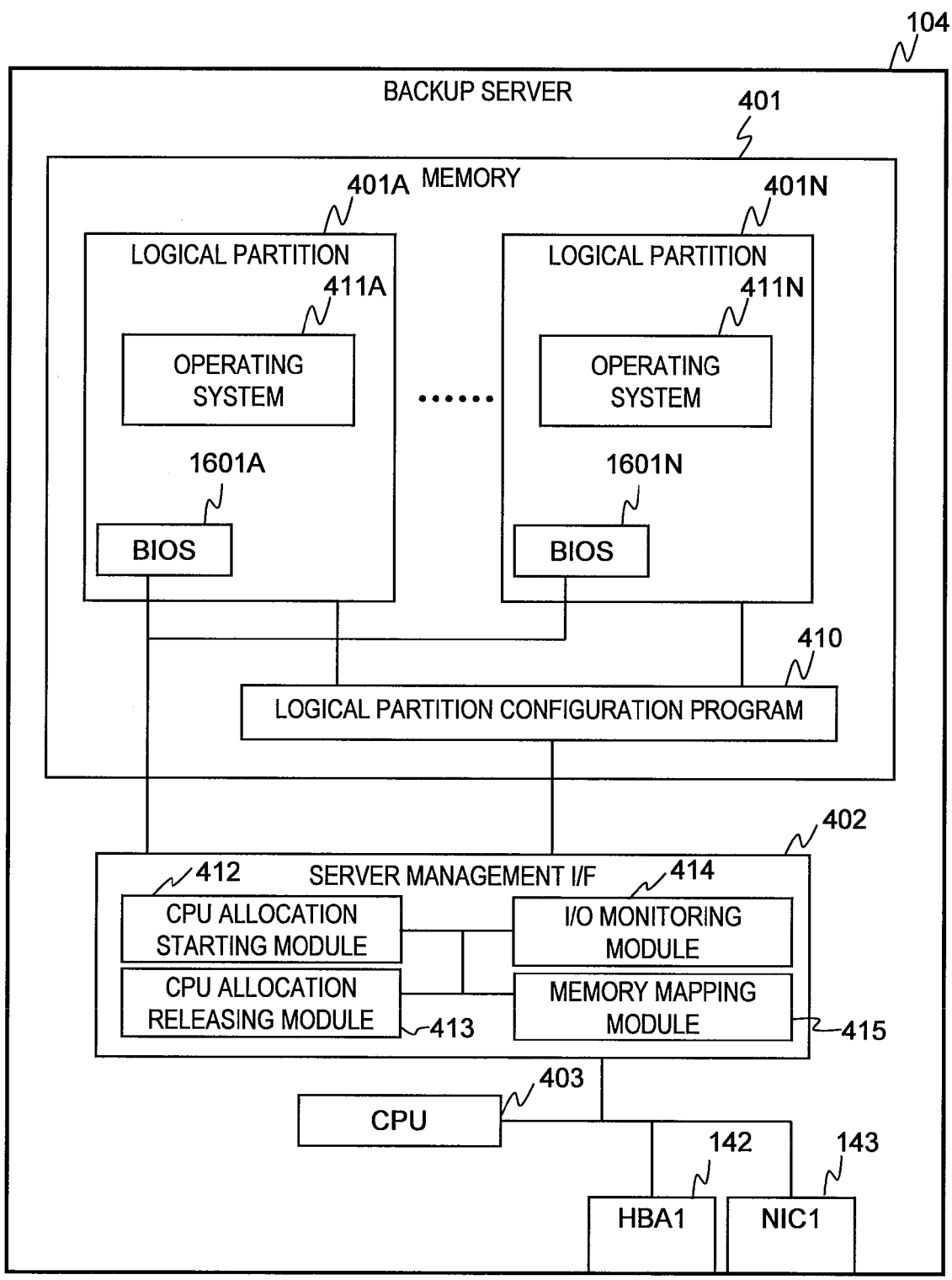
FIG. 16 is a block diagram showing a configuration of a backup server in accordance with the third embodiment of this invention.

FIG. 16 shows a block diagram of a configuration of a backup server 104 in the third embodiment of this invention.

Each logical partition 401 has a BIOS (Basic Input/Output System) 1601 for controlling the start-up of its OS 411 and for controlling the processes of the OS 411 for the hardware.

The BIOS 1601 has a function for specifying a predetermined logical disk drive of the disk array device 105 that stores the OS 411.

In this third embodiment, each logical partition 401 has the BIOS 1601 instead of the EFI 1416 as described above. Even in such a configuration, each logical partition 401 can execute processes just like in the first and second embodiments described above, so that the hardware initialization time can also be reduced in this third embodiment.

According to this invention, therefore, it is possible to start up a logical partition 401 that takes over an application job from an error-occurred active server quickly, thereby the fail-over processing time can be reduced.

While the present invention has been described in detail and pictorially in the accompanying drawings, the present invention is not limited to such detail but covers various obvious modifications and equivalent arrangements, which fall within the purview of the appended claims.

What is claimed is:

1. A fail-over method employed for a computer system including an active server for executing an application for executing a job; a disk array apparatus having a start-up disk used for the active server; a backup server for executing the application instead of the active server when an error occurs in the active server, thereby taking over execution of the job; and a management sever for managing the active server and the backup server;

the backup server having a first processor and a first memory, the first memory storing a program for dividing the first processor logically, and the logically divided first processor being allocated to create a logical partition, the fail-over method comprising:

a first step for obtaining, by the management server, configuration information of the active server and creating a logical partition in the backup server so as to correspond to the active server according to the obtained configuration information;

a second step for starting up, by the backup server, the created logical partition;

a third step for releasing, by the backup server, allocation of the first processor to the logical partition to stop the operation of the logical partition when the created logical partition in the backup server reaches a predetermined state;

a fourth step for detecting, by the management server, an error that occurs in the active server;

a fifth step for stopping, by the management server, upon error detection in the active server, the active server in which error is detected;

a sixth step for searching, by the management server, the logical partition having same configuration as the active server in which error is detected; and a seventh step for requesting, by the management server, allocation of the first processor to the searched logical partition to start up the logical partition, wherein the predetermined state referred to in the third step is a state in which a start-up monitoring module of an operating system has received a request of reading data stored in the start-up disk from the started-up logical partition, and wherein the third step includes a step of requesting, by the start-up monitoring module of the operating system, to release allocation of the first processor to the logical partition.

2. The fail-over method according to claim 1, wherein the first step includes a step of changing, by the management server, an allocation of a memory area from a memory area used by the created logical partition to a memory area required by the logical partition in a stand-by state, and wherein the seventh step includes a step of changing, by the management server, an allocation of a memory area from the memory area to a memory area to be used by the created logical partition.

3. The fail-over method according to claim 1, wherein the predetermined state referred to in the third step is also a state in which a memory capacity used by the logical partition has reached a predetermined capacity.

4. The fail-over method according to claim 1, wherein the predetermined state referred to in the third step is a state in which at least one application to execute the job on the logical partition has been completed to start up.

5. The fail-over method according to claim 1,
wherein the active server has a second processor and a second memory,
wherein a program stored in the second memory divides the second processor logically and the logically divided second processor is allocated to create a logical partition of an active server, and
wherein the application for executing the job is executed on the created logical partition of the active server.

6. A computer system comprising:
an active server for executing an application for executing a job;
a disk array apparatus having a start-up disk used for the active server;
a backup server for executing the application instead of the active server when an error occurs in the active server, thereby taking over execution of the job; and
a management server for managing the active server and the backup server,
wherein the backup server comprises a first processor and a first memory, executes a program stored in the first memory to divide the first processor logically, and allocates the logically divided first processor to create a logical partition,
wherein the management server comprises a fail-over processing module for executing a fail-over processing to enable the backup server to take over execution of a job from the active server when an error occurs in the active server,
wherein the fail-over processing module obtains configuration information of the active server and creates a logical partition in the backup server so as to correspond to the active server according to the obtained configuration information,
wherein the fail-over processing module instructs the backup server to start up the created logical partition, and to releases allocation of the first processor to the logical partition to stop the operation of the logical partition when the logical partition started up in the backup server reaches a predetermined state,
wherein when an error is detected in the active server, the fail-over processing module stops the active server, searches a logical partition having same configuration as the active server in which error is detected, requests allocation of the first processor to the searched logical partition, and starts up the logical partition, and
wherein the created logical partition executes the application instead of the active server in which error is detected, thereby taking over execution of the job from the active server in which error is detected,
wherein the predetermined state is a state in which a start-up monitoring module of an operating system has received a request of reading data stored in the start-up disk from the started-up logical partition, and
wherein the start-up monitoring module of the operating system requests to release allocation of the first processor to the logical partition in the predetermined state.

7. The computer system according to claim 6,
wherein the fail-over processing module changes an allocation of a memory area from a memory area used by the created logical partition to a memory area required by the logical partition in a stand-by state after creating the logical partition, and
wherein the fail-over processing module changes an allocation of a memory area from the changed memory area to a memory area to be used by the created logical partition upon completing to start up the logical partition.

8. The computer system according to claim 6, wherein the predetermined state is also a state in which a memory capacity used by the logical partition has reached a predetermined capacity.

9. The computer system according to claim 6, wherein the predetermined state is also a state in which at least one application to execute the job on the logical partition has been completed to start up.

10. The computer system according to claim 6,
wherein the active server comprises a second processor and a second memory,
wherein a program stored in the second memory divides the second processor logically and the logically divided second processors is allocated to create a logical partition of an active server, and
wherein the application for executing the job is executed on the created logical partition of the active server.

11. A management server for managing the active server and the backup server and implemented in a computer system including an active server for executing an application for executing job; a disk array apparatus having a start-up disk used for the active server; a backup server for executing the application instead of the active server when an error occurs in the active server, thereby taking over execution of the job,
wherein the backup server has a first processor and a first memory, executes a program stored in the first memory to divide the first processor logically, and allocates the logically divided first processor to create a logical partition,
wherein the management server comprises a fail-over processing module for executing a fail-over processing to enable the backup server to take over execution of a job from the active server when an error occurs in the active server,
wherein the fail-over processing module is configured to:
obtain configuration information of the active server to create a logical partition in the backup server so as to correspond to the active server according to the obtained configuration information;
instruct the backup server to start up the created logical partition;
instruct the backup server to release allocation of the first processor to the logical partition to stop the operation of the logical partition when the logical partition started up in the backup server reaches a predetermined state;
instruct the backup server to stop the active server when an error is detected therein;
search a logical partition having same configuration as the active server in which error is detected; and
request allocation of the first processor to the searched logical partition to start up the logical partition,
wherein the predetermined state is a state in which a start-up monitoring module of an operating system has received a request of reading data stored in the start-up disk from the started-up logical partition, and
wherein the start-up monitoring module of the operating system requests to release allocation of the first processor to the logical partition in the predetermined state.

12. The management server according to claim 11,
wherein the fail-over processing module changes an allocation of a memory area from a memory area used by the created logical partition to a memory area required by the logical partition in a stand-by state after creating the logical partition, and wherein the fail-over processing module changes an allocation of a memory area from the changed memory area to a memory area to be used by the created logical partition upon completing start up the logical partition.

13. The management server according to claim 11, wherein the predetermined state is also a state in which a memory capacity used by the logical partition has reached a predetermined capacity.

14. The management server according to claim 11, wherein the predetermined state is also a state in which at least one application to execute the job on the logical partition has been completed to start up.

15. The management server according to claim 11, wherein the active server has a second processor and a second memory, wherein a program stored in the second memory divides the second processor logically and the logically divided second processor is allocated to create a logical partition of an active server, and wherein the application for executing the job is executed on the created logical partition of the active server.

16. A backup server setting method employed for a computer system including an active server for executing an application for executing a job; a disk array apparatus having a start-up disk used for the active server; a backup server for executing the application instead of the active server when an error occurs in the active server, thereby taking over execution of the job; and a management server for managing the active server and the backup server, the backup server having a first processor and a first memory, a program stored in the first memory dividing the first processor logically, and the logically divided first processor being allocated to create a logical partition, the method comprising:

a first step for obtaining, by the management server, configuration information of the active server and creating a logical partition in the backup server so as to correspond to the active server according to the obtained configuration information;

a second step for starting up, by the backup server, starts up the created logical partition; and a third step for releasing, by the backup server, allocation of the first processor to the logical partition to stop the operation of the logical partition when receiving a request of reading data stored in the start-up disk from the started-up logical partition.

17. The backup server setting method according to claim 16, wherein the first step includes a step of changing a memory area used by the created logical partition to a memory area to be required stand-by state.

\* \* \* \* \*